US012642291B2

(12) United States Patent
Jones

(10) Patent No.: US 12,642,291 B2
(45) Date of Patent: Jun. 2, 2026

(54) POPCORN COATING DEVICE

(71) Applicant: Wilbert Jones, Culver City, CA (US)

(72) Inventor: Wilbert Jones, Culver City, CA (US)

( * ) Notice: Subject to any disclaimer, the term of this patent is extended or adjusted under 35 U.S.C. 154(b) by 836 days.

(21) Appl. No.: 17/965,007

(22) Filed: Oct. 13, 2022

(65) Prior Publication Data

US 2024/0122225 A1 Apr. 18, 2024

(51) Int. Cl.
*A23P 20/18* (2016.01)

(52) U.S. Cl.
CPC ................................... *A23P 20/18* (2016.08)

(58) Field of Classification Search
CPC ...... A23G 3/26; A23G 3/0089; A23G 3/2092; A23G 3/2076; A23P 20/18
USPC ........................................................... 99/483
See application file for complete search history.

(56) References Cited

U.S. PATENT DOCUMENTS

| | | | | |
|---|---|---|---|---|
| 945,355 | A * | 1/1910 | Wild et al. ............... | A23G 3/26 |
| | | | | 118/19 |
| 1,061,460 | A * | 5/1913 | Elliott ...................... | A23B 5/06 |
| | | | | 99/476 |
| 1,374,938 | A * | 4/1921 | McNulty, Jr. ............ | A23G 3/26 |
| | | | | 118/19 |
| 3,167,035 | A * | 1/1965 | Benson .................... | A23G 3/26 |
| | | | | 118/19 |
| 3,198,655 | A * | 8/1965 | Gisiger ................... | B01J 2/003 |
| | | | | 65/60.8 |

| | | | | |
|---|---|---|---|---|
| 3,557,718 | A * | 1/1971 | Chivers ................... | A23L 7/122 |
| | | | | 426/291 |
| 3,607,313 | A * | 9/1971 | Roth ....................... | A23P 20/15 |
| | | | | 118/19 |
| 4,168,919 | A * | 9/1979 | Rosen ..................... | B28B 17/02 |
| | | | | 366/186 |
| 4,430,003 | A * | 2/1984 | Beattie .................... | B01F 25/74 |
| | | | | 366/175.3 |
| 4,477,483 | A * | 10/1984 | Lewis .................. | B05B 13/0221 |
| | | | | 118/19 |
| 4,543,907 | A * | 10/1985 | Fowler .................... | B05C 19/00 |
| | | | | 118/19 |
| 4,614,162 | A * | 9/1986 | Ryan ....................... | A23P 20/13 |
| | | | | 118/19 |
| 4,658,708 | A * | 4/1987 | Rastoin ................. | A23G 3/2076 |
| | | | | 198/659 |
| 4,957,042 | A * | 9/1990 | van Lengerich ......... | A21C 3/04 |
| | | | | 366/85 |
| 5,090,593 | A * | 2/1992 | Ejike ...................... | A23P 20/13 |
| | | | | 118/19 |
| 5,100,683 | A * | 3/1992 | Singer ..................... | A23G 3/26 |
| | | | | 426/305 |
| 5,386,939 | A * | 2/1995 | Ruegg .................... | A23P 20/13 |
| | | | | 239/689 |
| 5,433,961 | A * | 7/1995 | Lanner .................... | A23G 3/26 |
| | | | | 426/94 |

(Continued)

FOREIGN PATENT DOCUMENTS

| | | | | | |
|---|---|---|---|---|---|
| ES | | 2401222 A1 * | 4/2013 | ............. | A23P 20/15 |
| WO | WO20160832294 | | 6/2016 | | |

*Primary Examiner* — Jimmy Chou

(57) ABSTRACT

A popcorn coating device for coating popcorn in a flavoring includes a tube that has a channel configured for receiving a quantity of popcorn from a top end and dispensing it from the bottom end. A flavor dispensing module includes a pump for urging a liquid flavoring through a perforated pipe positioned within the tube while the popcorn passes through the channel to coating the popcorn in the flavoring.

14 Claims, 9 Drawing Sheets

(56)            References Cited

U.S. PATENT DOCUMENTS

| | | | | |
|---|---|---|---|---|
| 5,514,399 A * | 5/1996 | Cordera | A21D 13/24 | |
| | | | 222/413 | |
| 5,520,457 A * | 5/1996 | Gontero | A23G 3/20 | |
| | | | 366/233 | |
| 5,538,747 A * | 7/1996 | Mueller | B02B 1/06 | |
| | | | 426/507 | |
| 5,673,613 A * | 10/1997 | Price | A21B 3/04 | |
| | | | 126/369 | |
| 5,698,252 A * | 12/1997 | Kelly | A21D 15/08 | |
| | | | 118/308 | |
| 5,707,448 A * | 1/1998 | Cordera | A21D 13/24 | |
| | | | 222/413 | |
| 5,823,401 A * | 10/1998 | Zgoda | G01F 11/22 | |
| | | | 222/444 | |
| 5,964,146 A * | 10/1999 | Kelly | A23L 7/122 | |
| | | | 118/308 | |
| 6,045,009 A * | 4/2000 | Beirle | B65G 53/4633 | |
| | | | 414/220 | |
| 6,135,317 A * | 10/2000 | Ruelle | B01J 8/24 | |
| | | | 222/254 | |
| 6,228,172 B1 * | 5/2001 | Taylor | A23G 3/26 | |
| | | | 118/712 | |
| 6,487,962 B1 * | 12/2002 | Horn | A47J 37/044 | |
| | | | 99/348 | |
| 6,766,924 B1 * | 7/2004 | Ophardt | G01F 11/24 | |
| | | | 222/368 | |
| 6,913,773 B2 * | 7/2005 | Degady | A23G 4/20 | |
| | | | 426/302 | |
| 7,703,639 B2 * | 4/2010 | Landau | B65G 65/4881 | |
| | | | 222/138 | |
| 7,765,920 B2 * | 8/2010 | Keller | C13B 30/028 | |
| | | | 34/586 | |
| 7,902,727 B1 | 3/2011 | Sham | | |
| 8,500,295 B2 | 8/2013 | Chang | | |
| 8,800,390 B2 | 8/2014 | Weston | | |
| 10,512,364 B2 * | 12/2019 | Chen | A23F 3/06 | |
| 10,588,545 B2 | 3/2020 | Di Croce | | |
| D943,520 S | 2/2022 | Takahashi | | |
| 2002/0145350 A1 | 10/2002 | Henderson | | |
| 2003/0061942 A1 * | 4/2003 | Erickson | A23F 5/04 | |
| | | | 99/476 | |
| 2011/0185908 A1 * | 8/2011 | Berto | G01F 11/24 | |
| | | | 222/71 | |
| 2012/0244256 A1 * | 9/2012 | Jong-Nam | A23L 29/256 | |
| | | | 426/575 | |
| 2013/0025468 A1 * | 1/2013 | Virzi | A47J 31/542 | |
| | | | 99/323.3 | |
| 2018/0213816 A1 * | 8/2018 | Amend | A23G 3/24 | |

* cited by examiner

POPCORN COATING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to popcorn coating devices and more particularly pertains to a new popcorn coating device for coating popcorn in a flavoring.

(2) Description of Related Art Including Information Disclosed Under 37 CFR 1.97 and 1.98

The prior art relates to popcorn coating devices which coat popcorn during or after popping in a flavoring mixture. The prior art discloses devices which spray liquid flavoring mixtures from above the popcorn down onto the popcorn, devices which stir the popcorn to distribute a flavoring mixture, and devices which are inserted into a food container containing popcorn for application of the flavoring mixture.

BRIEF SUMMARY OF THE INVENTION

An embodiment of the disclosure meets the needs presented above by generally comprising a tube being elongated and having a perimeter wall. A channel extends through the tube from a top end of the tube to a bottom end of the tube. The channel is open at the top end and the bottom end, and the tube is configured for receiving a quantity of popcorn through the top end and dispensing the quantity of popcorn through the bottom end. A flavoring supply module is coupled to the tube and comprises a liquid flavoring and a supply reservoir containing the liquid flavoring. It also comprises a dispensing pipe that is coupled to and is positioned within the tube. The dispensing pipe has an exterior wall and a plurality of perforations extending through the exterior wall. At least one of a pair of ends of the dispensing pipe is open. The flavoring supply module further comprises a pump that is in fluid communication with the supply reservoir and a supply pipe fluidically couples the pump to the dispensing pipe. The pump selectively urges the liquid flavoring from the supply reservoir through the supply pipe, through the dispensing pipe, and out of the plurality of perforations.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
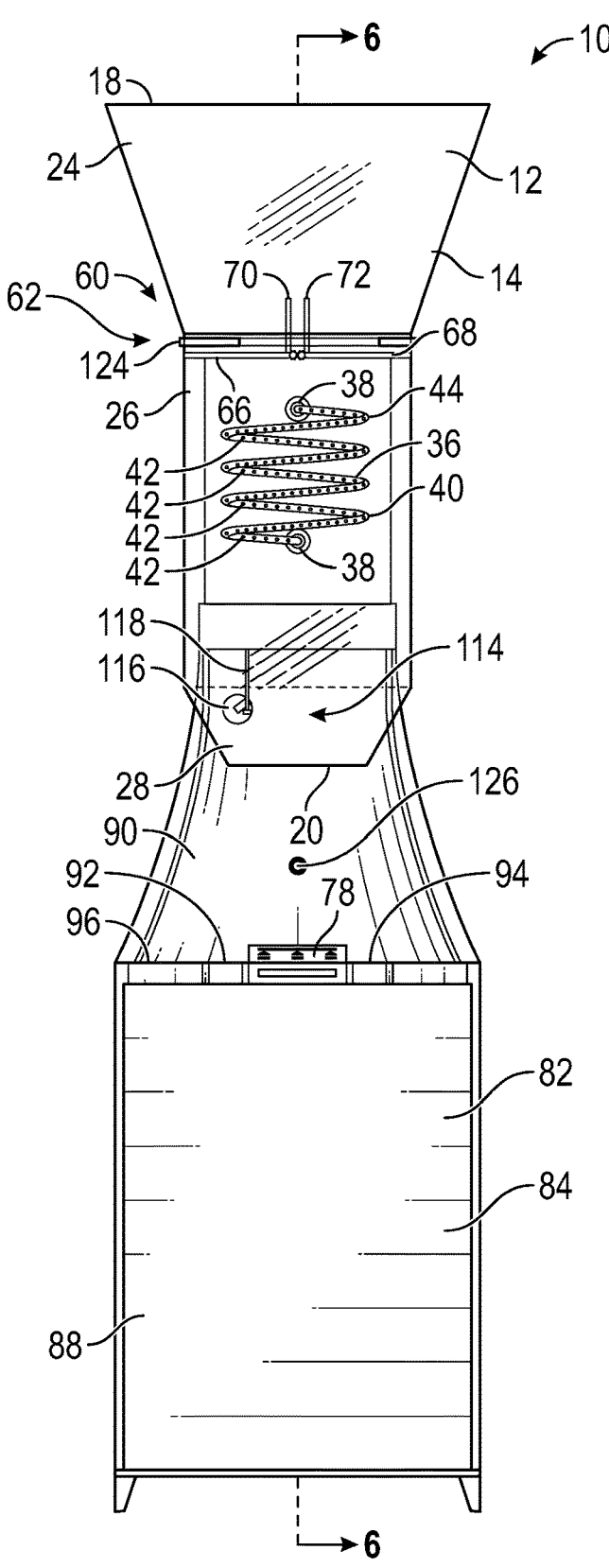
FIG. 1 is a front view of a popcorn coating device according to an embodiment of the disclosure.
Figure 2:
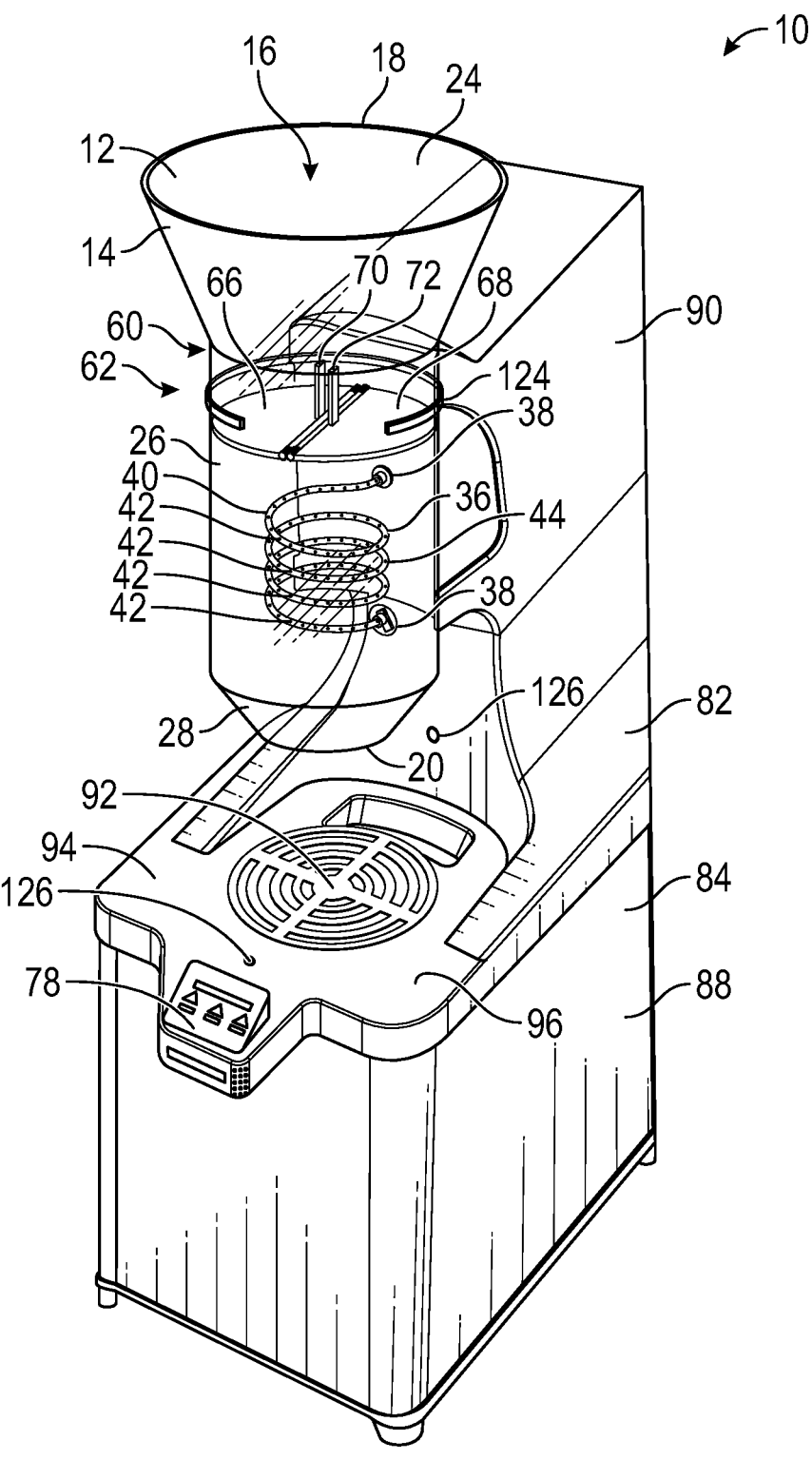
FIG. 2 is a top front side perspective view of an embodiment of the disclosure.
Figure 3:
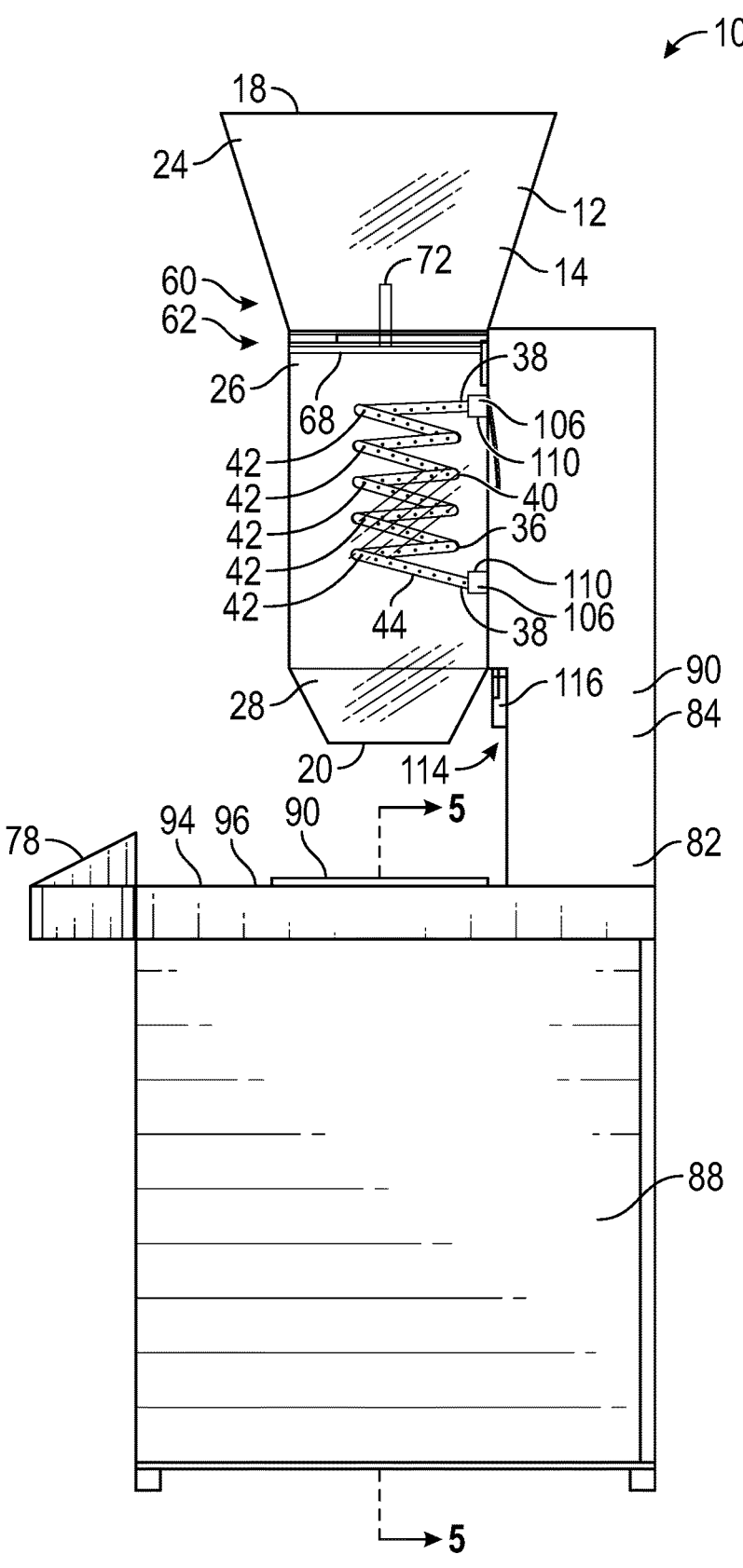
FIG. 3 is a side view of an embodiment of the disclosure.
Figure 4:
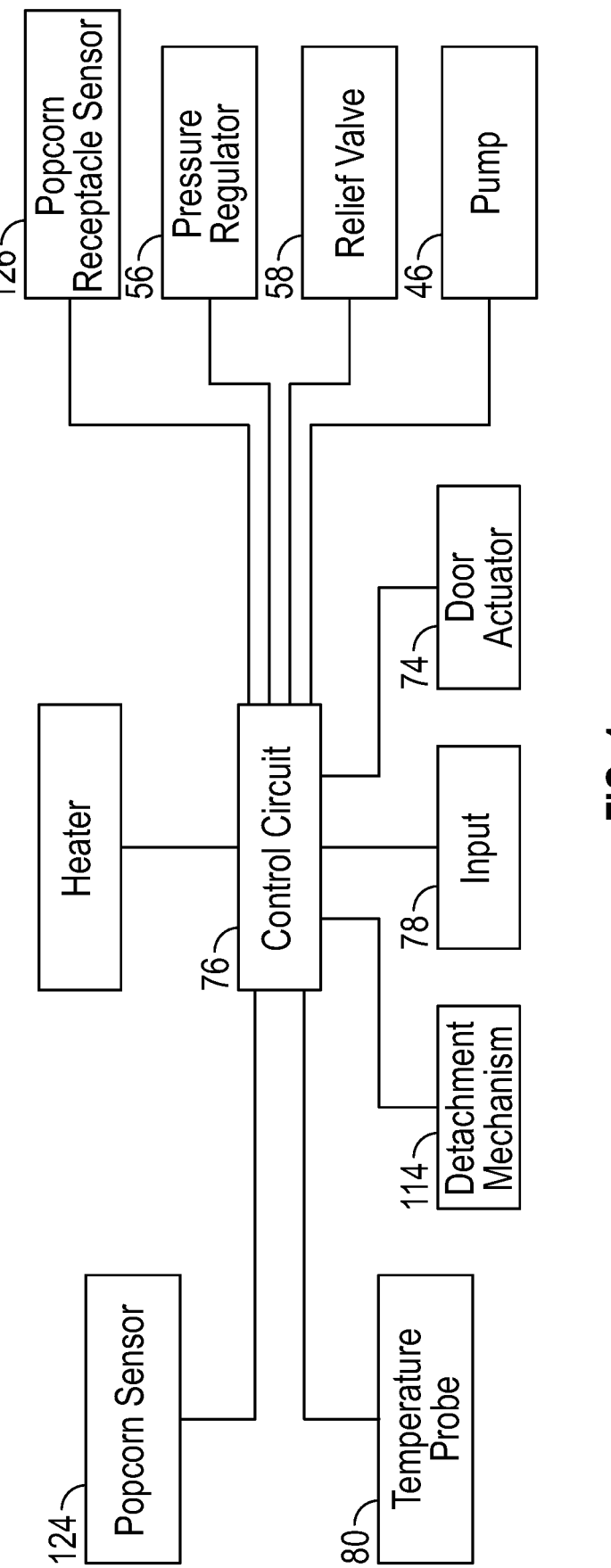
FIG. 4 is a block diagram of an embodiment of the disclosure.
Figure 5:
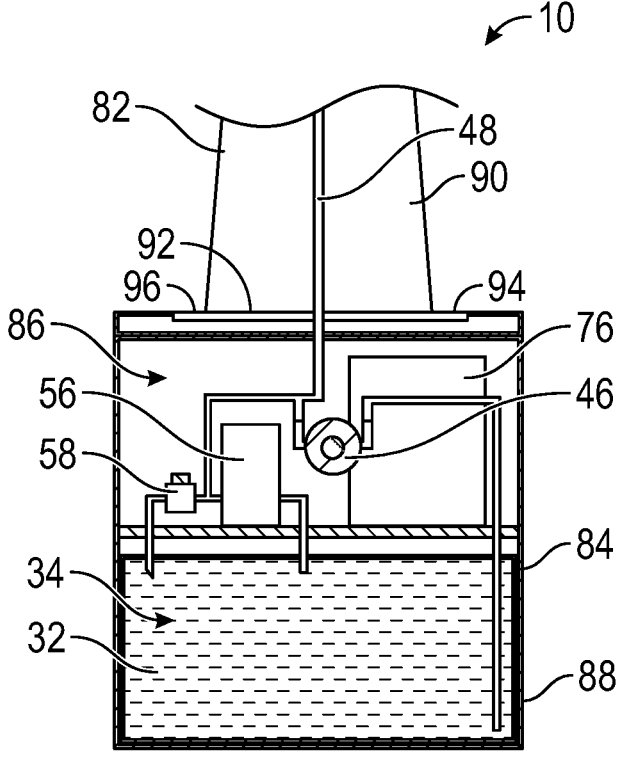
FIG. 5 is a cross-sectional view of an embodiment of the disclosure from arrows 5-5 in FIG. 3.
Figure 6A:
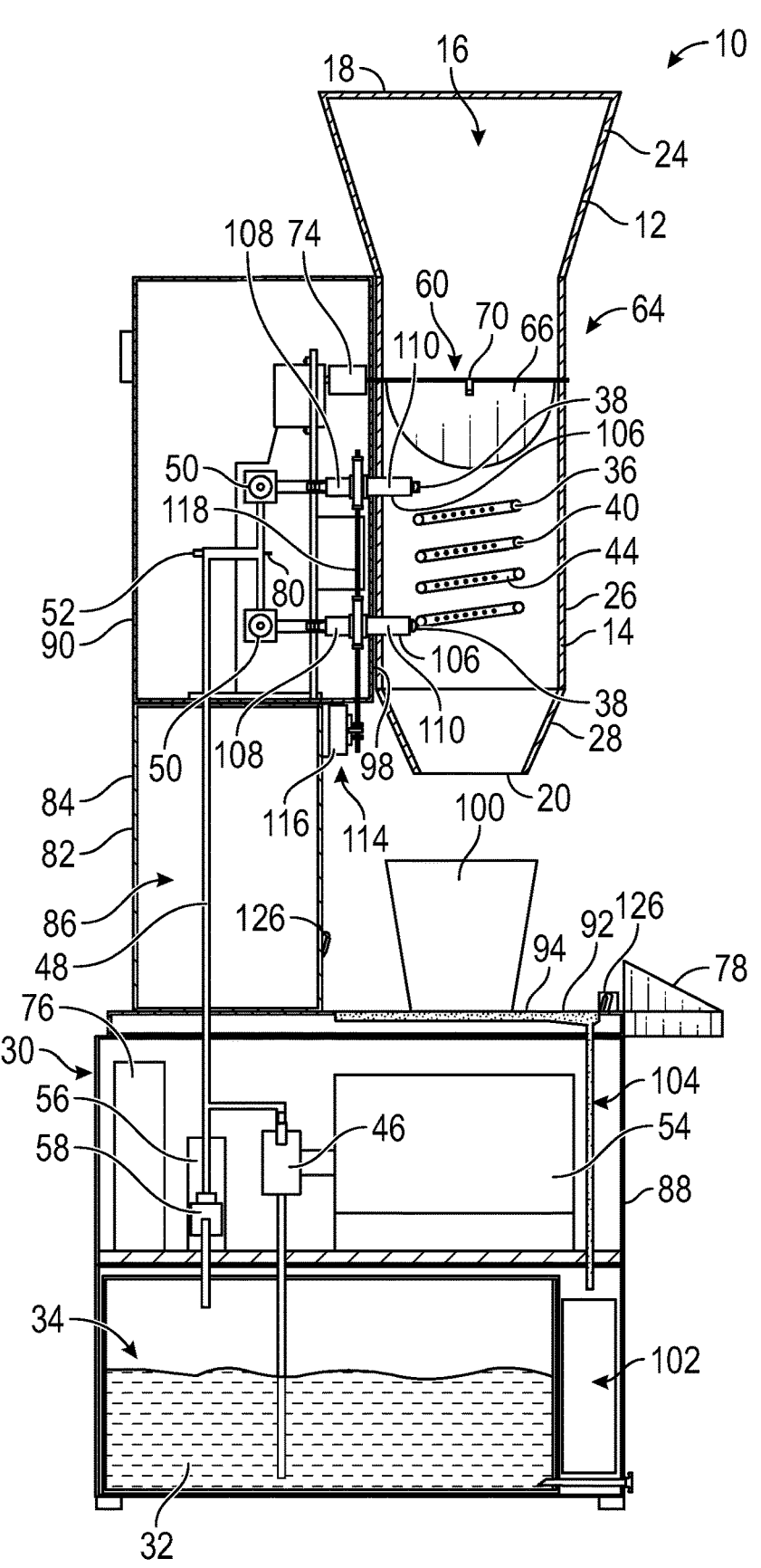
FIG. 6a is a cross-sectional view of an embodiment of the disclosure from arrows 6-6 in FIG. 1.
Figure 6B:
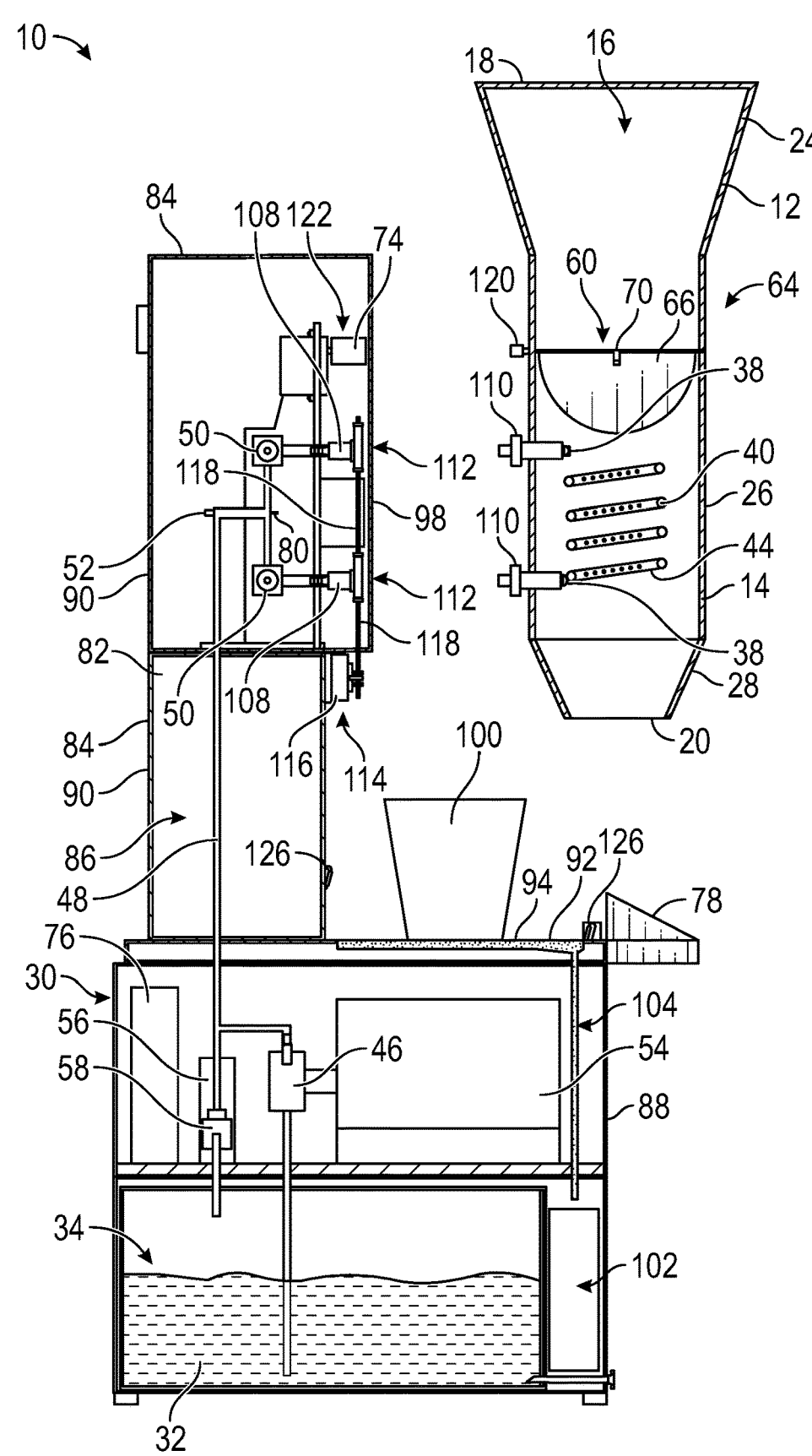
FIG. 6b is an exploded cross-sectional view of an embodiment of the disclosure from arrows 6-6 in FIG. 1.
Figure 7:
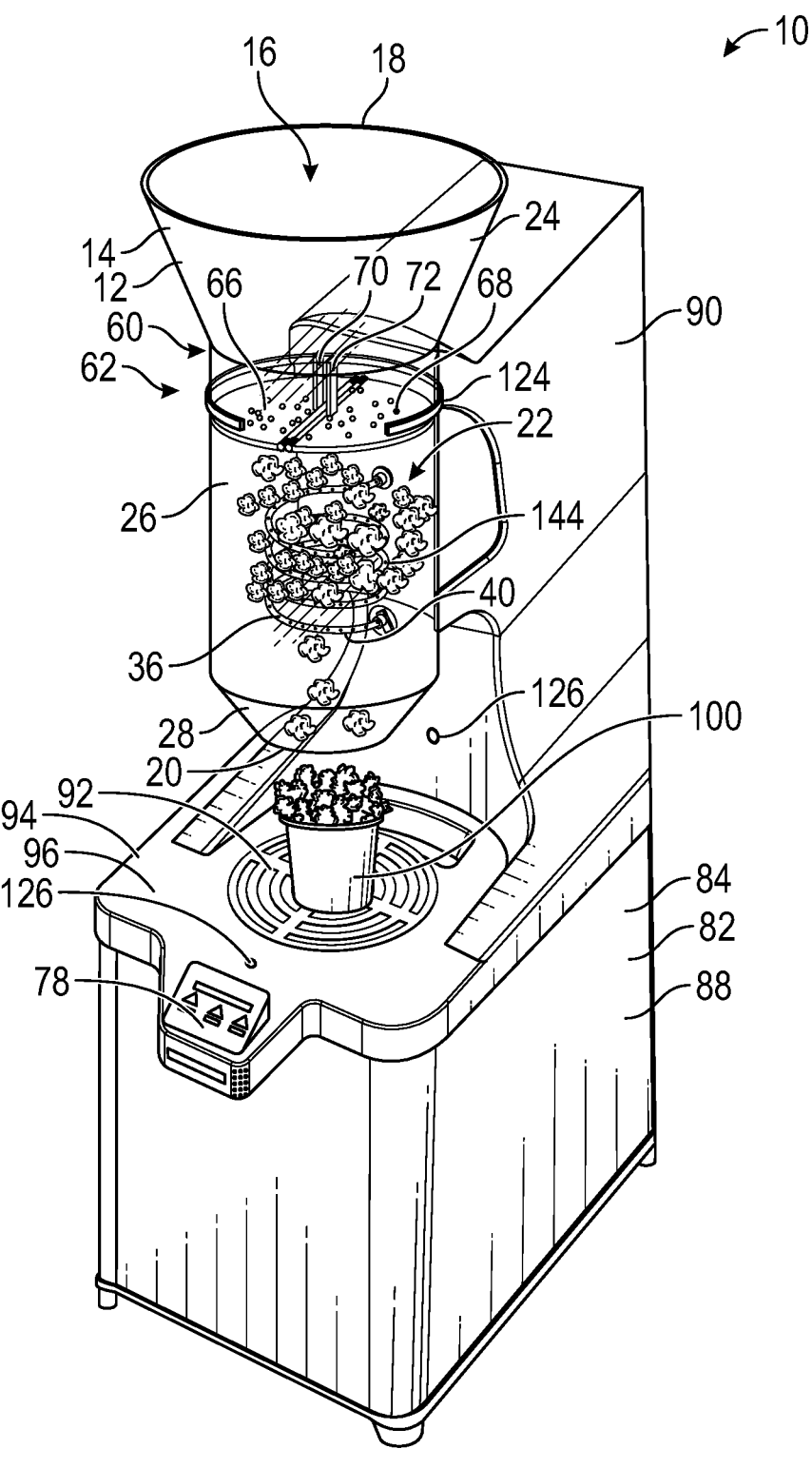
FIG. 7 is an in-use perspective view of an embodiment of the disclosure.
Figure 8:
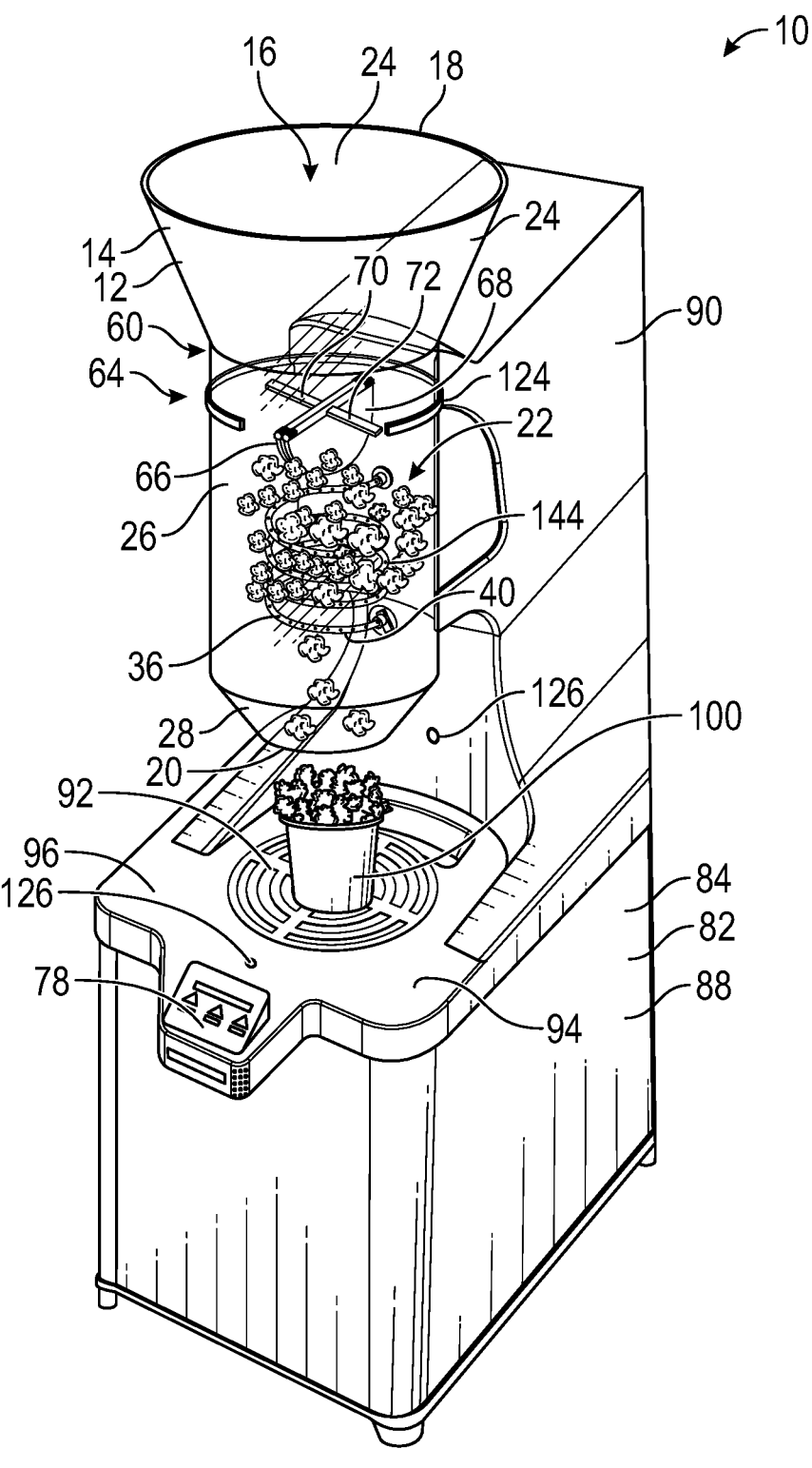
FIG. 8 is an in-use perspective view of an embodiment of the disclosure.

With reference now to the drawings, and in particular to FIGS. 1 through 8 thereof, a new popcorn coating device embodying the principles and concepts of an embodiment of the disclosure and generally designated by the reference numeral 10 will be described.

As best illustrated in FIGS. 1 through 8, the popcorn coating device 10 generally comprises a tube 12 is elongated and has a perimeter wall 14. The tube 12 has a channel 16 extending therethrough from a top end 18 of the tube 12 to a bottom end 20 of the tube 12. The channel 16 is open at the top end 18 and the bottom end 20 and is configured for receiving a quantity of popcorn 22 through the top end 18 and dispensing the quantity of popcorn 22 through the bottom end 20. The tube 12 comprising a top segment 24, a middle segment 26, and a bottom segment 28, with the middle segment 26 extending between the top segment 24 and the bottom segment 28. A cross-sectional area of the channel 16 narrows from the top end 18 to the middle segment 26 and from the middle segment 26 to the bottom end 20. The tube 12 is also translucent so that the quantity of popcorn 22 is visible through the tube 12.

A flavoring supply module 30 is coupled to the tube 12 and comprises a liquid flavoring 32 contained within a supply reservoir 34. The liquid flavoring 32 may be butter, butter oil, or any other liquid comprising flavoring for popcorn. The flavoring supply module 30 also comprises a dispensing pipe 36 which is coupled to and positioned within the tube 12. The dispensing pipe 36 has a pair of ends 38, and at least one of the pair of ends 38 of the dispensing pipe 36 is open. A plurality of perforations 42 is distributed across and extends through an exterior wall 44 of the dispensing pipe 36. The dispensing pipe 36 is formed into a helix 40 such that a central axis of the helix 40 is aligned with a central longitudinal axis of the tube 12. A pump 46 is in fluid communication with the supply reservoir 34 and the dispensing pipe 36 and selectively urges the liquid flavoring 32 from the supply reservoir 34 through the dispensing pipe 36 and out of the plurality of perforations 42.

A supply pipe 48 is in fluid communication with the pump 46 and the dispensing pipe 36. At least one shutoff valve 50 is coupled to the supply pipe 48 and is operable to selectively permit the liquid flavoring 32 to move from the pump 46 to the dispensing pipe 36. A heating element 52 is in thermal communication with the liquid flavoring 32. The heating element 52 may be a cartridge heater, which typically comprises a cylindrical structure having a length of about 5 inches and a width less than ½ inch that generates heat from an electrical current passing through resistive wire. Cartridge heaters are typically used for precise heating applications. The heating element 52 may be coupled to and extend into the supply pipe 48 such that it heats the liquid flavoring 32 as needed, which is generally more efficient than keeping a larger reservoir warm. However, the heating element 52 may be positioned near the supply reservoir 34 or any other position where the liquid flavoring 32 may be heated, and positioning the heating element 52 near the supply reservoir 34 may be advantageous in certain applications. The heating element 52 may also use an alternative method to heat such as induction, dielectric heating, combustion, or the like.

The pump 46 may also comprise a motor 54 for driving the pumping of the liquid flavoring 32. And the flavoring supply module 30 may comprise a pressure regulator 56 and a relief valve 58 for regulating pressure within the supply pipe 48. Each of the pressure regulator 56 and the relief valve 58 may direct liquid flavoring 32 back into the supply reservoir 34 when the pressure exceeds a pressure limit.

A release door 60 is mounted to the tube 12 and positioned within the channel 16. The release door 60 is movable between an open position 62 and a closed position 64 and is configured to permit the quantity of popcorn 22 through the channel 16 only when the release door 60 is in the open position 62. The release door 60 may comprise a first panel 66 and a second panel 68 which are each pivotably coupled to the tube 12. The first panel 66 engages the second panel 68 such that the first panel 66 and the second panel 68 pivot in opposite rotational directions. Each panel may have gear teeth, a frictionally engaging surface, or the like to achieve this coupling. When the release door 60 is in the closed position 64, the first panel 66 and the second panel 68 are laterally aligned and coplanar. When the release door 60 opens, the first panel 66 and the second panel 68 pivot toward the bottom end 20 of the tube 12. The release door 60 also comprises a first elongated member 70 and a second elongated member 72 which are coupled to the first panel 66 and the second panel 68 respectively. The first elongated member 70 and the second elongated member 72 each extend upwardly when the release door 60 is in the closed position 64 and extend outwardly away from each other when the release door 60 is in the open position 62. If the quantity of popcorn 22 clogs the channel 16 above the release door 60 such that it will not freely pass through the channel 16, the first elongated member 70 and the second elongated member 72 urge the popcorn through the channel 16.

A door actuator 74 engages the release door 60 and is movable to move the release door 60 between the open position 62 and the closed position 64. If the release door 60 comprises the first panel 66 and the second panel 68 as described above, the door actuator 74 actuates the release door 60 by pivoting one of the first panel 66 and the second panel 68. A control circuit 76 is electrically coupled to and programmed to operate each of the following: the pump 46, the heating element 52, the at least one shutoff valve 50, the pressure regulator 56, the pressure relief valve 58, and the door actuator 74. An input 78 is also electrically coupled to the control circuit 76 which may include commands for coating the quantity of popcorn 22 in the liquid flavoring 32 as the quantity of popcorn 22 passes through the channel 16. The input 78 may also include commands for selecting a temperature of the liquid flavoring 32. A temperature probe 80 may be also in thermal communication with the liquid flavoring 32 to determine the temperature of the liquid flavoring 32 and be in electrical communication with the control circuit 76. The temperature probe 80 may, for example, be positioned extending into the supply pipe 48 between the heating element 52 and the dispensing pipe 36. The control circuit 76 is also electrically coupled to an electrical power source, which may be a battery, an alternating current supply network, or the like.

In one embodiment, the tube 12 is coupled to a support structure 82 having an outer wall 84 that bounds an interior space 86. The support structure 82 comprises a base member 88, an upper member 90, and a platform 92. The upper member 90 is coupled to and extends upwardly from the base member 88, and the tube 12 is coupled to a front side 98 of the upper member 90. The platform 92 is positioned below the tube 12 and may be integrated with a front portion 96 of a top side 94 of the base member 88. The platform 92 is horizontally aligned and is configured for supporting a food container 100 on top of itself. The platform 92 may have impressions for holding dishes or other contours, but the platform 92 must be shaped to hold the food container 100 below the tube 12 such that the space between the food container 100 and the tube 12 is free from obstruction. The support structure 82 may also have a waste compartment 102 contained within the interior space 86 and a drain 104 that extends through the platform 92 and is in fluid communication with the waste compartment 102, thus collecting spilled liquid flavoring 32 to be collected in the waste compartment 102.

In a further embodiment that comprises the support structure 82, the tube 12 is detachable from the support structure 82. This embodiment may include at least one pipe fitting 106 coupling the supply pipe 48 to the dispensing pipe 36 which extends through the outer wall 84 of the support structure 82 and the perimeter wall 14 of the tube 12. The at least one pipe fitting 106 comprises a supply portion 108 coupled to the supply pipe 48 and a dispensing portion 110 coupled to the dispensing pipe 36. The dispensing portion 110 is removable from the supply portion 108, and the pipe fitting 106 may further comprise a latch 112 that is biased to secure the dispensing portion 110 to the supply portion 108.

This embodiment may further comprise a detachment mechanism 114 that is electrically coupled to the control circuit 76 and engageable with the latch 112 such that the latch 112 releases the dispensing portion 110 of the at least one pipe fitting 106 from the supply portion 108. For example, the detachment mechanism 114 may include a rotary solenoid actuator 116 and an actuator arm 118 such that when the rotary solenoid is actuated, it pivots to pull the actuator arm 118 into engagement with the latch 112 to release the dispensing portion 110 from the supply portion 108.

In this embodiment, the door actuator 74 may also be separable from the release door 60. For example, if the release door 60 comprises the first panel 66 and the second panel 68 as described above, a door tab 120 may be coupled to one of the first panel 66 and the second panel 68 and extend through the perimeter wall 14 of the tube 12 away from the release door 60. In this case, the door actuator 74 has a slot 122 positioned for receiving the door tab 120 when the tube 12 is coupled to the support structure 82. The door tab 120 is selectively engageable by the door actuator 74 to pivot the one of the first panel 66 and the second panel 68 when the door tab 120 is received by the slot 122.

The device 10 may also comprise at least one popcorn sensor 124 coupled to the tube 12 and positioned in the channel 16 which is configured to detect the presence of the quantity of popcorn 22 above the release door 60. In such a case, the at least one popcorn sensor 124 is electrically coupled to the control circuit 76 and may be programmed to detect motion, a proximity of an object, pressure, or the like. The device 10 may also comprise at least one popcorn receptacle sensor 126 coupled to and positioned on the support structure 82 configured for detecting the presence of a popcorn receptacle beneath the tube 12. In such a case, the at least one popcorn receptacle sensor 126 is electrically coupled to the control circuit 76 and may be programmed to detect motion, a proximity of an object, pressure, or the like.

In use, the quantity of popcorn 22 is poured into the top end 18 of the tube 12 to rest on the release door 60. The food container 100 may be positioned beneath the tube 12. Then a command is given through the input 78 to the control circuit 76 to open the release door 60 and pump 46 the liquid flavoring 32 onto the quantity of popcorn 22 as it falls through the channel 16. In some embodiments, the temperature of the liquid flavoring 32 may also be selected using the input 78. The control circuit 76 may be programmed to prevent the coating of the quantity of popcorn 22 if, for example, the at least one popcorn sensor 124 does not detect the presence of the quantity of popcorn 22 or the at least one popcorn receptacle sensor 126 does not detect the presence of the food container 100.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A popcorn coating device comprising:
a tube being elongated and having a perimeter wall, the tube having a channel extending therethrough from a top end of the tube to a bottom end of the tube, the channel being open at the top end and the bottom end, the tube being configured for receiving a quantity of popcorn through the top end and dispensing the quantity of popcorn through the bottom end; and
a flavoring supply module being coupled to the tube, the flavor supply module comprising:
a supply reservoir;
a liquid flavoring contained in the supply reservoir;
a dispensing pipe being coupled to and being positioned within the tube, the dispensing pipe having an exterior wall and a plurality of perforations extending through the exterior wall, the dispensing pipe having a pair of ends, at least one of the pair of ends of the dispensing pipe being open;
a pump being in fluid communication with the supply reservoir and the dispensing pipe, the pump selectively urging the liquid flavoring from the supply reservoir through the dispensing pipe and out of the plurality of perforations;
a supply pipe fluidically coupling the pump to the dispensing pipe; and
a release door being mounted to the tube and being positioned within the channel, the release door being movable between an open position and a closed position, the release door being configured to permit the quantity of popcorn through the channel only when the release door is in the open position, wherein the release door further comprises a first panel and a second panel, each of the first panel and the second panel being pivotably coupled to the tube, the first panel engaging the second panel such that the first panel and the second panel pivot in opposite rotational directions, the first panel and the second panel being laterally aligned and coplanar with each other when the release door is in the closed position, each of the first panel and the second panel pivoting toward the bottom end of the tube when the release door is moved from the closed position to the open position.

2. The device of claim 1, wherein the tube comprises a top segment, a middle segment, and a bottom segment, the middle segment extending between the top segment and the bottom segment, a cross-sectional area of the channel narrowing from the top end of the tube to the middle segment, the cross-sectional area narrowing from the middle segment to the bottom end of the tube.

3. The device of claim 1, wherein the tube is translucent.

4. The device of claim 1, wherein the plurality of perforations is distributed across the exterior wall of the dispensing pipe.

5. The device of claim 1, wherein the flavoring supply module further comprises at least one shutoff valve being coupled to the supply pipe, the at least one shutoff valve being operable to selectively permit the liquid flavoring to move from the pump to the dispensing pipe.

6. The device of claim 1, wherein the flavor supply module further comprises a heating element being in thermal communication with the liquid flavoring.

7. The device of claim 1, wherein the release door further comprises a first elongated member and a second elongated member, the first elongated member being coupled to and extending upwardly from the first panel when the release door is closed, the second elongated member being coupled to and extending upwardly from the second panel when the release door is closed, each of the first elongated member and the second elongated member pivoting downward when the release door opens, each of the first elongated member and the second elongated member being configured for urging the quantity of popcorn through the channel when the release door opens.

8. The device of claim 1, further comprising a door actuator engaging the release door, the door actuator being movable to move the release door between the open position and the closed position.

9. The device of claim 1, further comprising a door actuator engaging the release door, the door actuator being movable to move the release door between the open position and the closed position, the door actuator being pivotable to pivot one of the first panel and the second panel.

10. The device of claim 1, further comprising a support structure coupled to the tube, the support structure having an outer wall and an interior space bounded by the outer wall, the support structure comprising:

a base member;

an upper member being coupled to and extending upwardly from the base member, the tube being coupled to a front side of the upper member; and a platform being horizontally aligned and being positioned below the tube, the platform being configured for supporting a food container thereon, the platform being integrated with a front portion of a top side of the base member;

the support structure containing within the interior space the supply reservoir, the pump, and at least a portion of the supply pipe.

11. The device of claim 10, further comprising at least one pipe fitting coupling the supply pipe to the dispensing pipe, the at least one pipe fitting extending through the outer wall of the support structure and the perimeter wall of the tube, the at least one pipe fitting comprising a supply portion and a dispensing portion, the supply portion being coupled to the supply pipe, the dispensing portion being coupled to the dispensing pipe, the dispensing portion being removable from the supply portion such that the tube is removable from the support structure, the at least one pipe fitting comprising a latch being biased to secure the dispensing portion to the supply portion.

12. The device of claim 11, further comprising:

a release door being mounted to the tube and being positioned within the channel, the release door being movable between an open position and a closed position, the release door being configured to permit the quantity of popcorn through the channel only when the release door is in the open position, the release door comprising a first panel and a second panel, each of the first panel and the second panel being pivotably coupled to the tube, the first panel engaging the second panel such that the first panel and the second panel pivot in opposite rotational directions, the first panel and the second panel being laterally aligned and coplanar with each other when the release door is in the closed position, each of the first panel and the second panel pivoting toward the bottom end of the tube when the release door is moved from the closed position to the open position;

a door actuator engaging the release door, the door actuator being movable to move the release door between the open position and the closed position; and a door tab being coupled to and extending from one of the first panel and the second panel, the door tab extending through the perimeter wall of the tube, the door actuator having a slot being positioned to receive the door tab therein when the tube is coupled to the support structure, the door tab being selectively engageable by the door actuator to pivot the one of the first panel and the second panel when the door tab is received by the slot.

13. A popcorn coating device comprising:

a tube being elongated and having a perimeter wall, the tube having a channel extending therethrough from a top end of the tube to a bottom end of the tube, the channel being open at the top end and the bottom end, the tube being configured for receiving a quantity of popcorn through the top end and dispensing the quantity of popcorn through the bottom end;

a flavoring supply module being coupled to the tube, the flavor supply module comprising:

a supply reservoir;

a liquid flavoring contained in the supply reservoir;

a dispensing pipe being coupled to and being positioned within the tube, the dispensing pipe having an exterior wall and a plurality of perforations extending through the exterior wall, the dispensing pipe having a pair of ends, at least one of the pair of ends of the dispensing pipe being open;

a pump being in fluid communication with the supply reservoir and the dispensing pipe, the pump selectively urging the liquid flavoring from the supply reservoir through the dispensing pipe and out of the plurality of perforations; and a supply pipe fluidically coupling the pump to the dispensing pipe;

wherein the flavoring supply module further comprises at least one shutoff valve being coupled to the supply pipe, the at least one shutoff valve being operable to selectively permit the liquid flavoring to move from the pump to the dispensing pipe; and wherein the flavor supply module further comprises a heating element being in thermal communication with the liquid flavoring, the heating element being coupled to and extending into the supply pipe.

14. A popcorn coating device comprising:

a tube being elongated and having a perimeter wall, the tube having a channel extending therethrough from a top end of the tube to a bottom end of the tube, the channel being open at the top end and the bottom end, the tube being configured for receiving a quantity of popcorn through the top end and dispensing the quantity of popcorn through the bottom end, the tube comprising a top segment, a middle segment, and a bottom segment, the middle segment extending between the top segment and the bottom segment, a cross-sectional area of the channel narrowing from the top end of the tube to the middle segment, the cross-sectional area narrowing from the middle segment to the bottom end of the tube, the tube being translucent;

a flavoring supply module being coupled to the tube, the flavor supply module comprising:

a supply reservoir;

a liquid flavoring contained in the supply reservoir;

a dispensing pipe being coupled to and being positioned within the tube, the dispensing pipe having an exterior wall and a plurality of perforations extending through the exterior wall, the dispensing pipe having a pair of ends, at least one of the pair of ends of the dispensing pipe being open, the plurality of perforations being distributed across the exterior wall of the dispensing pipe, the dispensing pipe being formed into a helix such that a central axis of the helix is aligned with a central longitudinal axis of the tube;

a pump being in fluid communication with the supply reservoir and the dispensing pipe, the pump selectively urging the liquid flavoring from the supply reservoir through the dispensing pipe and out of the plurality of perforations;

a supply pipe fluidically coupling the pump to the dispensing pipe;

at least one shutoff valve being coupled to the supply pipe, the at least one shutoff valve being operable to selectively permit the liquid flavoring to move from the pump to the dispensing pipe;

a heating element being in thermal communication with the liquid flavoring, the heating element being coupled to and extending into the supply pipe;

a release door being mounted to the tube and being positioned within the channel, the release door being movable between an open position and a closed position, the release door being configured to permit the quantity of popcorn through the channel only when the release door is in the open position, the release door comprising:

a first panel and a second panel, each of the first panel and the second panel being pivotably coupled to the tube, the first panel engaging the second panel such that the first panel and the second panel pivot in opposite rotational directions, the first panel and the second panel being laterally aligned and coplanar with each other when the release door is in the closed position, each of the first panel and the second panel pivoting toward the bottom end of the tube when the release door is moved from the closed position to the open position; and a first elongated member and a second elongated member, the first elongated member being coupled to and extending upwardly from the first panel when the release door is closed, the second elongated member being coupled to and extending upwardly from the second panel when the release door is closed, each of the first elongated member and the second elongated member pivoting downward when the release door opens, each of the first elongated member and the second elongated member being configured for urging the quantity of popcorn through the channel when the release door opens;

a door actuator engaging the release door, the door actuator being movable to move the release door between the open position and the closed position, the door actuator being pivotable to pivot one of the first panel and the second panel;

a control circuit being electrically coupled to the pump, the heating element, and the door actuator;

an input being electrically coupled to the control circuit;

a support structure being coupled to the tube, the support structure having an outer wall and an interior space bounded by the outer wall, the support structure containing within the interior space the supply reservoir, the pump, at least a portion of the supply pipe, the at least one shutoff valve, the heating element, at least a portion of the door actuator, and the control circuit, the support structure comprising:

a base member;

an upper member being coupled to and extending upwardly from the base member, the tube being coupled to a front side of the upper member; and a platform being horizontally aligned and being positioned below the tube, the platform being configured for supporting a food container thereon, the platform being integrated with a front portion of a top side of the base member;

at least one pipe fitting coupling the supply pipe to the dispensing pipe, the at least one pipe fitting extending through the outer wall of the support structure and the perimeter wall of the tube, the at least one pipe fitting comprising a supply portion and a dispensing portion, the supply portion being coupled to the supply pipe, the dispensing portion being coupled to the dispensing pipe, the dispensing portion being removable from the supply portion such that the tube is removable from the support structure, the at least one pipe fitting comprising a latch being biased to secure the dispensing portion to the supply portion;

a detachment mechanism being engageable with the latch such that the latch releases the dispensing portion of the at least one pipe fitting from the supply portion, the detachment mechanism being electrically coupled to the control circuit; and a door tab being coupled to and extending from one of the first panel and the second panel, the door tab extending through the perimeter wall of the tube, the door actuator having a slot being positioned to receive the door tab therein when the tube is coupled to the support structure, the door tab being selectively engageable by the door actuator to pivot the one of the first panel and the second panel when the door tab is received by the slot.

* * * * *